United States Patent [19]
Manz

[11] Patent Number: 5,993,672
[45] Date of Patent: Nov. 30, 1999

[54] SLOW SAND FILTER FOR USE WITH INTERMITTENTLY FLOWING WATER SUPPLY AND METHOD OF USE THEREOF

[75] Inventor: David H. Manz, Calgary, Canada

[73] Assignee: University Technologies International Inc., Calgary, Canada

[21] Appl. No.: 08/788,497

[22] Filed: Jan. 28, 1997

Related U.S. Application Data

[63] Continuation of application No. 08/509,628, Jul. 31, 1995, abandoned, which is a continuation-in-part of application No. 08/141,598, Oct. 27, 1993, abandoned.

[51] Int. Cl.[6] .................................................. B01D 37/04
[52] U.S. Cl. ........................................ 210/744; 210/807
[58] Field of Search ................................. 210/744, 807, 210/86, 104, 143, 289, 291, 456

[56] References Cited

U.S. PATENT DOCUMENTS

| | | | |
|---|---|---|---|
| 3,817,378 | 6/1974 | Ross | 210/744 |
| 4,765,892 | 8/1988 | Hulbert et al. | 210/290 |
| 5,032,261 | 7/1991 | Pyper | 210/137 |

OTHER PUBLICATIONS

Slow Sand Filtration, L. Huisman, W.E. Wood, World Health Organization, Geneva, 1974, 32 pages.
Slow Sand Filtration for Community Water Supply, J.T. Visscher, R. Paramasivam, A. Raman, H.A. Heijnen, Technical Paper No. 24, International Reference Centre for Community Water Supply and Sanitation, The Hague, The Netherlands, 32 pages, 1987.

Intermittently Operated Slow Sand Filtration: A New Water Treatment Process by Byron James Buzunis, Department of Civil Engineering, The University of Calgary, Mar., 1995, 220 pages.

Report on the UTI Funded Research Project on the Intermittently Operated Slow Sand Filter, University of Calgary, Canada, Dec. 1997 (unpublished).

Effect of Intermittent Operation of Slow Sand Filters on Filtered Water Quality, Paramasivam, R, et al, Indian Journal Of Environmental Health, vo. 22, No. 2, 136–150, 1986.

*Primary Examiner*—Ivars Cintins
*Attorney, Agent, or Firm*—Anthony R. Lambert

[57] ABSTRACT

An intermittently operating slow sand filter uses the damming of water in a raised pipe to provide a constant level of water in a slow sand filter container. The container includes a water inlet and outlet, and is partially filled with sand or other filter material. A pipe from the water outlet in the slow sand filter is raised upward to the desired level of water over the sand before descending to a water reservoir. Water backs up in the pipe and the container to the desired level above the top of the sand, even when the flow of water is intermittent. The schmutzdeuke forms at the top of the filter medium. The water level in such a manually operated slow sand filter, using fine quartz sand as the filter medium, and at ambient temperatures (about 21° C.) is maintained above about 1 cm above the top of the filter medium and below about 8 cm above the top of the slow sand filter.

4 Claims, 6 Drawing Sheets

SLOW SAND FILTER FOR USE WITH INTERMITTENTLY FLOWING WATER SUPPLY AND METHOD OF USE THEREOF

CROSS-REFERENCE TO RELATED APPLICATIONS

This application is a continuation of application Ser. No. 08/509,628 filed Jul.31, 1995, abandoned which is a continuation-in-part of application Ser. No. 08/141,598 filed Oct. 27, 1993, abandoned.

FIELD OF THE INVENTION

This invention relates to slow sand filters, and their method of use.

CLAIM TO COPYRIGHT

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND AND SUMMARY OF THE INVENTION

Slow sand filters are known to be effective in removing bacteria, parasites, Giardia cysts, Cryptosporidium oocysts and viruses. While bacteria, parasites and viruses may be killed or rendered inactive with disinfection, dormant cysts and oocysts are very resistant to disinfection unless disinfectant is administered very intensively. Slow sand filters may be used to supply clean water directly for consumption or may be used to supply water for further treatment, such as by reverse osmosis and ultra- filtration, both of which processes require quite clean water to begin with.

In the prior art, slow sand filters are known that require a continuous water supply, and that are intended for use with continuously flowing water. Such a prior art slow sand filter is described in U.S. Pat. No. 5,032,261 to Pyper. The slow sand filter includes a container partially filled with sand. The slow sand filter is provided with a water inlet and water outlet. Water continuously flows through the sand at a rate of about or slightly over 0.08 m/hour, with the sand providing a filter effect for the flowing water. In addition, when the sand is immersed in the flowing water for several days, a biolayer forms at the top of the sand. This layer is referred to as a schmutzdeuke, which is formed from various organisms such as algae, plankton, diatoms, protozoa and bacteria. The schmutzdeuke entraps and partially digests and breaks down organic matter container in the raw water passing through the filter. The organic matter accumulates on the schmutzdeuke and simple inorganic salts are formed. At the same time, inert suspended particles in the raw water are removed mechanically.

Such slow sand filters are not, however, effective where the water supply is intermittent, such as at country cottages, which limits the utility of prior art slow sand filters. In such cases, the water in prior art slow sand filters becomes stagnant and the schmutzdeuke dies.

Thus, in Visscher et al, "Slow Sand Filtration for Community Water Supply", Technical Paper no. 24, International Reference Centre for Community Water Supply and Sanitation, The Hague, The Netherlands, 1987, at page 31 it is stated that intermittent operation of slow sand filters should not be permitted because "it has been shown conclusively that an unacceptable breakthrough of bacteriological pollutants occurs four to five hours after the filters recommence operation". Likewise, Huisman, "Slow Sand Filtration", World Health Organization, Geneva, 1974, at page 32 teaches that slow sand filters should be operated at as constant a filtration rate as possible. Thus the understanding in the art was that slow sand filters should not be operated intermittently. By intermittently it is not meant that the slow sand filter be occasionally taken out of operation for maintenance, such as is described in U.S. Pat. No. 4,765,892 of Hulbert, but that the slow sand filter remains in operation, with the schmutzdeuke alive, during the period when there is no flow of water through the filter. By contrast with the present invention, the filter of Hulbert is cleaned during maintenance, so that the schmutzdeuke does not remain alive until it is operated again.

For a slow sand filter of the type described by Hulbert, with depth of water above the filter material being in the range of 60 cm to 2.44 m, the schmutzdeuke will begin to die immediately as the water flow is shut off during periods of intermittent operation and will die overnight due to lack of oxygen. This can be shown from theoretical calculations of the oxygen demand of the schmutzdeuke.

The inventor has discovered that by maintaining the static water level above the top of the sand (or other filter material) above a minimum depth, such that the schmutzdeuke does not dry out or be disturbed by the incoming water supply, and below a maximum depth, such that the schmutzdeuke is not killed by stagnant water, the schmutzdeuke may be preserved and the effectiveness of the slow sand filter maintained even where the supply of water is intermittent. The static water level, or maintenance level, is the water level in the slow sand filter while it is not being operated, that is, not being used to supply water. The schmutzdeuke layer of the slow sand filter of the present invention will typically survive more than a weekend and may survive more than a week in conditions of no flow of water between periods of flow of water through the filter, such as may occur while a cottager is away from a country cottage, and ultimately the schmutzdeuke is not killed off by a lack of oxygen but by a lack of food. By providing a life for the schmutzdeuke greater than 24 hours during periods when there is no flow of water through the slow sand filter, the present invention is believed to be distinguished from the prior art.

This is a surprising result in that it was considered in the art that the schutzdeucke would die in slow sand filters in which water was not flowing. The present invention therefore provides a substantial improvement over the known prior art.

Since normal operation of a slow sand filter results in the biological layer increasing in thickness, with a consequent reduction of flow of water, intermittent operation of the slow sand filter of the present invention actually improves flow due to the slight starvation and size reduction of the biological layer.

One such intermittently operating slow sand filter uses the damming of water in a raised pipe to provide a constant maintenance level of water in a slow sand filter container. The container includes a water inlet and outlet, and is partially filled with sand or other filter material. A pipe from the water outlet in the slow sand filter is raised upward to the desired level of water over the sand before descending to a water reservoir. Water backs up in the pipe and the container to the desired level above the top of the sand, even when the flow of water is intermittent. The schmutzdeuke forms at the top of the filter medium. The water level in such a manually operated slow sand filter, using fine quartz sand as the filter medium, and at ambient temperatures (about 21° C.) is maintained above about 1 cm above the top of the filter medium and below about 8 cm above the top of the slow sand filter.

In another such intermittently operating slow sand filter, the water level is maintained automatically when not being used at a desired maintenance level, and otherwise is kept in a desired range of levels above the top of the sand (or other filter material) in a partially filled container. Automatic control is provided by a control system that senses the water level in the slow sand filter. The supply of water may be from a pump or from a gravity flow controlled by a valve. During times when water is not being taken from the slow sand filter, the water level is maintained at a desired maintenance level, within a range such as specified above for the manually operated slow sand filter.

The water from an automatic intermittently operating slow sand filter is preferably supplied to a reservoir. Water level in the reservoir may also be controlled within a desired range using upper and lower level limit detectors and a valve on an outlet line from the container to the reservoir.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

Figure 1:
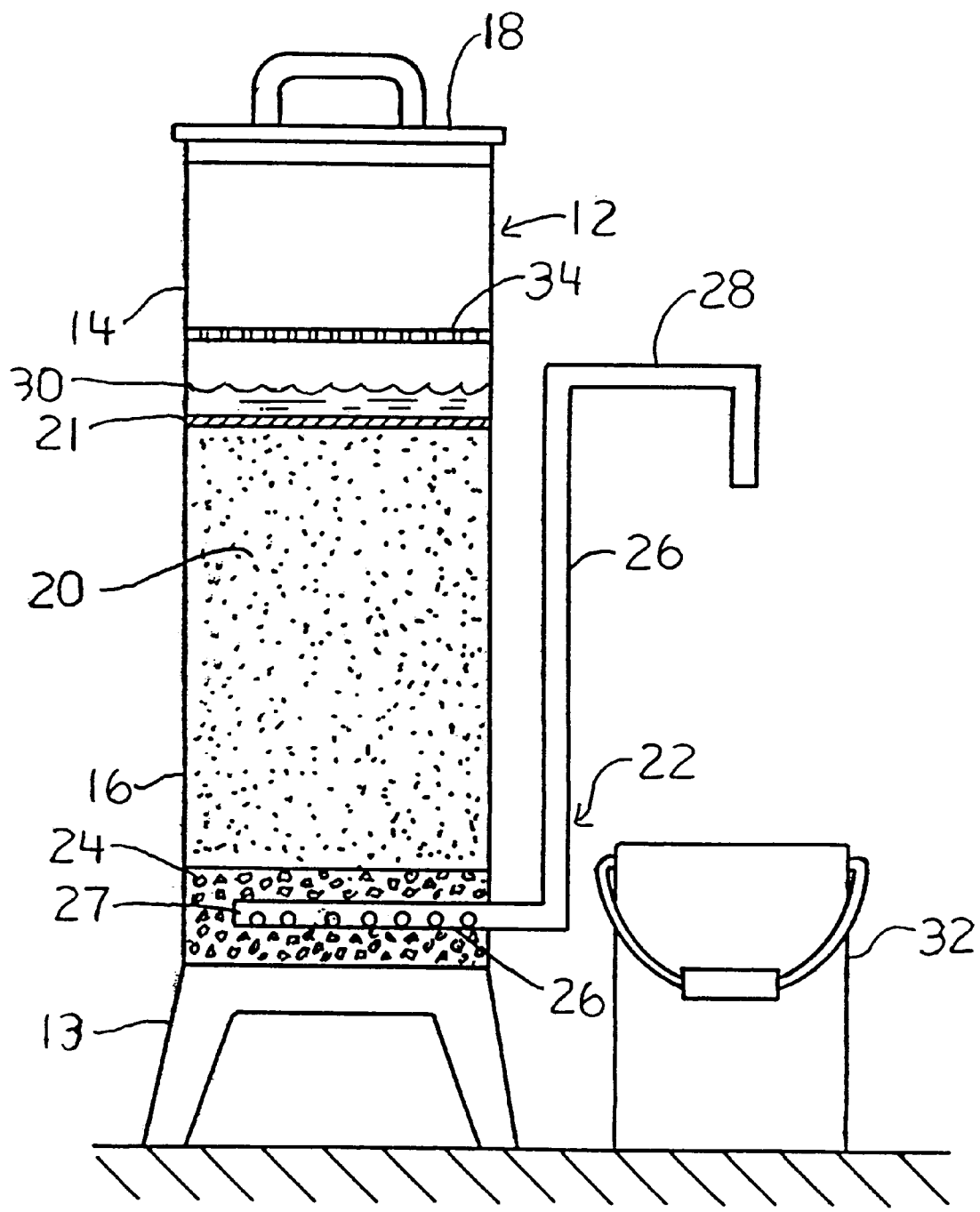
FIG. 1 is a side section schematic of a manually operated intermittently operating slow sand filter according to the invention in resting condition.
Figure 2:
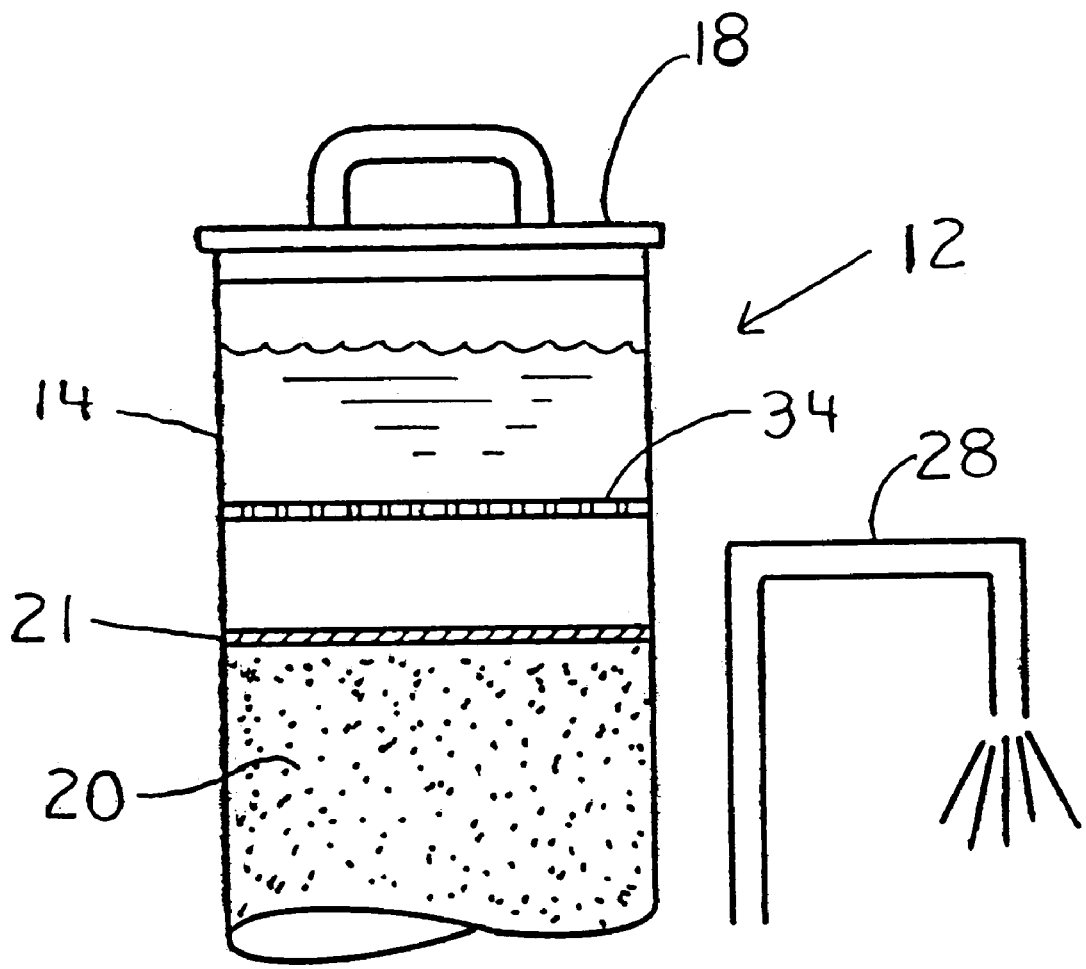
FIG. 2 is a side view schematic of the top of the apparatus shown in FIG. 1 in operating condition.

Referring to FIGS. 1 and 2, there is shown a manually operated slow sand filter for use with an intermittent supply of water. The unit is intended, for example, for stand alone use in a person's dwelling. The slow sand filter includes a watertight container 12 having an upper portion 14 and a lower portion 16. The container 12 is supported on a base or support 13. The container 12 is preferably about 1 m to 1.2 m high and of variable cross-section, though for household use may have a diameter of about 40 cm. The container 12 may be made of PVC, concrete or other material suitable for containing potable water. The upper portion 14 of the container 12 is covered by a cover 18, which should completely cover the open top of the container 12 to prevent dust and other debris from accidentally entering the container 12. The open top of the container 12 forms a water inlet, which allows water to be poured into the open top of the container.

The lower portion 16 of the container 12 is filled to a depth of 40 cm or more with fine washed quartz sand 20, or other filter material suitable for use with slow sand filters (as for example described in U.S. Pat. No. 5,032,261. A water outlet 22 is formed in the lower portion 16 of the container 12. The water outlet 22 includes an underdrain layer of gravel 24 underlying the sand 20, and a perforated pipe 26 lying within the gravel 24 and extending out through a hole in the lower portion 16 of the container 12. The pipe 26 is a perforated PVC pipe of about 12 mm diameter, as are all the pipes described here, with 3 mm diameter holes spaced 25 mm between centers along the bottom of the perforated pipe. The pipe 26 is sealed at one end with a 12 mm PVC cap 27. The gravel 24 is preferably washed 19 mm quartz gravel or the like. The pipe 26 is embedded in the gravel 24 with a depth of about 5 cm of gravel above the crown of the pipe 26.

Water in the container 12 is maintained at a minimum level above the top 21 of the sand 20 preferably in the range 1 cm to 8 cm above the top of the sand, with the water in the container at ambient temperature (that is, is not heated), as for example 21° C., and ambient pressure (atmospheric pressure). The lower water level is selected to prevent drying of the schmutzdeuke or its disturbance from water falling onto the top of the water standing in the container. The upper water level is selected to prevent stagnation of the water during periods of intermittent supply. By stagnation is meant the condition in which the water at the level of the schmutzdeuke becomes so deprived of oxygen that the schmutzdeuke dies. The actual upper level is believed to depend in part on the type of filter medium, and the ambient temperature, and is readily experimentally determinable. The range of 1 cm to 8 cm is known to be beneficial for fine quartz sand at 21° C. In general, the lower the water level the better. Hence, the range 1 cm to 5 cm is preferred. The water level may be maintained by extending the pipe 26 out from the water outlet upward to the desired level as indicated at invert 28 of pipe 26. The water level so maintained is indicated at 30. This water level 30 is maintained when the filter is not being operated, that is, when the filter has not just been replenished with raw water, known as the resting condition. During operation, the water level will rise, as indicated in FIG. 2, and gradually reduce to the desired level 30 as the filtered water drains through the sand 20 into the pipe 26. Filtered water is collected in a bucket or other suitable potable water reservoir 32. Under such conditions, a schmutzdeuke forms in the top layer 21 of the sand.

When water is added to the container 12 during operation, it may disturb the schmutzdeuke unless added carefully. To prevent disturbance of the schmutzdeuke it is preferable to include a diffuser plate 34 secured by any suitable means such as that shown in FIG. 4 to the container 12 above the top 21 of the sand 20. The diffuser plate 34 is perforated with 2 mm holes spaced about 1 cm apart and is located about 10 cm above the sand, at least higher than the desired water level 30. Water entering the container 12 during operation initially accumulates above the diffuser plate 34 and gradually percolates onto the schmutzdeuke without disturbing it.

In operation, the container 12 will normally be filled with water to the desired level 30 and the schmutzdeuke will be alive. To operate the filter, the cover 18 is removed and raw water poured into the container 12. Filtered water will immediately begin flowing into the potable water reservoir 32. The water will continue to drain from the filter until the level of the water above the schmutzdeuke is below the bottom of the drain pipe invert 28. Maintenance is required when the schmutzdeuke develops into a layer thick enough that it reduces flow rate through the filter below acceptable levels. Maintenance consists of removing the schmutzdeuke and 1 or 2 cm of sand. The filter can be expected to be back in operation 1 day after being cleaned.

Referring to FIGS. 3 to 8, there is shown an automatically operated slow sand filter for use with an intermittent supply of water. The unit is intended, for example, for providing a continuously available supply of filtered water to household faucets without householder participation. The slow sand filter includes a watertight container 42 having an upper portion 44 and a lower portion 46 of like construction and size to the container 12, and having a similar cover 48. A pipe 49 passes through the wall of the container 42 in its upper portion 44 and forms a raw water inlet or intake. The lower portion 46 of the container 42 is filled to a depth of 40 cm or more (for example 61 cm) with filter material 50, similar to the filter material 20. A water outlet 52 is formed in the lower portion 46 of the container 42. The water outlet 52 includes an underdrain layer of gravel 54 underlying the sand 50, and a perforated pipe 56 with end cap 57 lying within the gravel 54 and extending out through a hole in the lower portion 46 of the container 42. The gravel 54 and sand 50 are preferably separated with a geomembrane 53. The outlet 52 is constructed in like manner to the outlet 22 with pipe 56 leading to a potable water reservoir 62 (shown in FIGS. 7 and 8). Preferably, the pipe 56 is embedded in at least 10 cm of gravel 54. The rate of flow through the raw water intake 49 must be greater than the maximum rate of flow through the filter sand 50.

Figure 4:
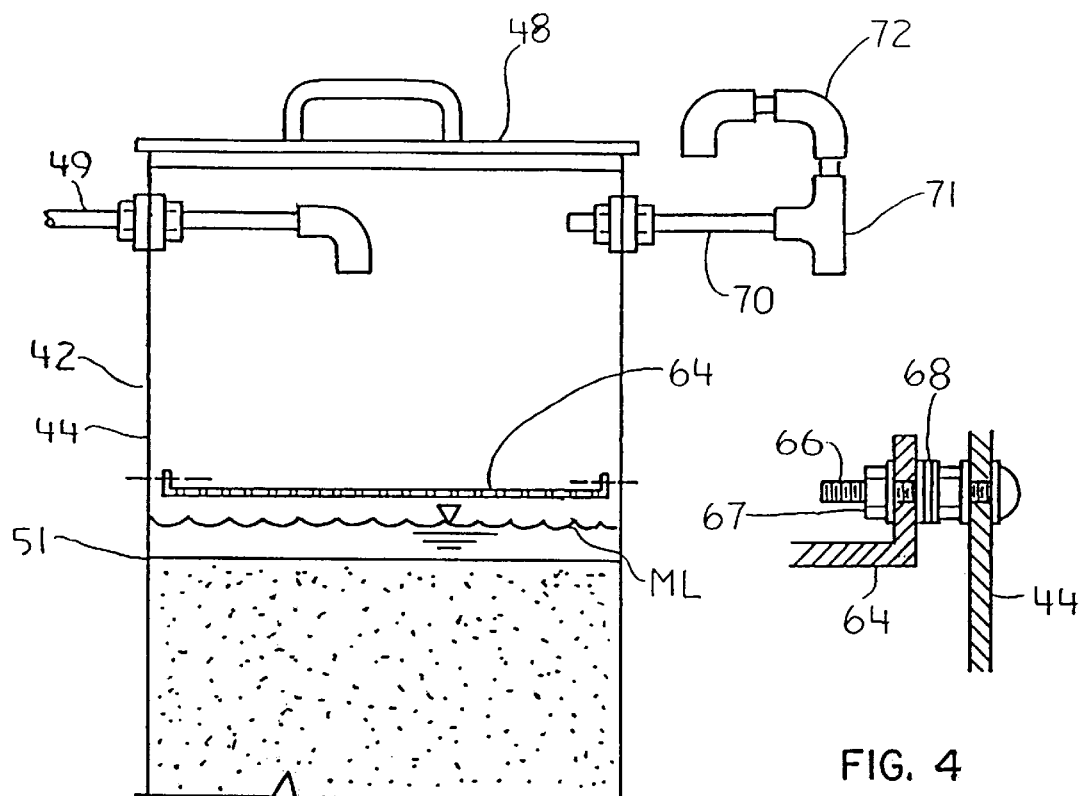
FIG. 4 is a detail of a diffusor plate holder for use in the apparatus of FIG. 3.
Figure 3:
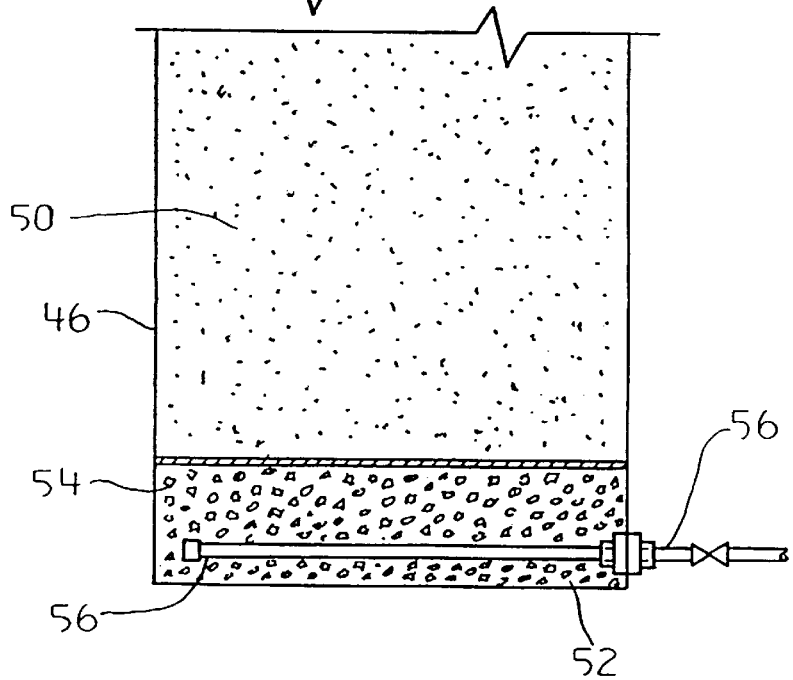
FIG. 3 is a side view schematic of an automatically operated intermittently operating slow sand filter according to the invention.
Figure 5:
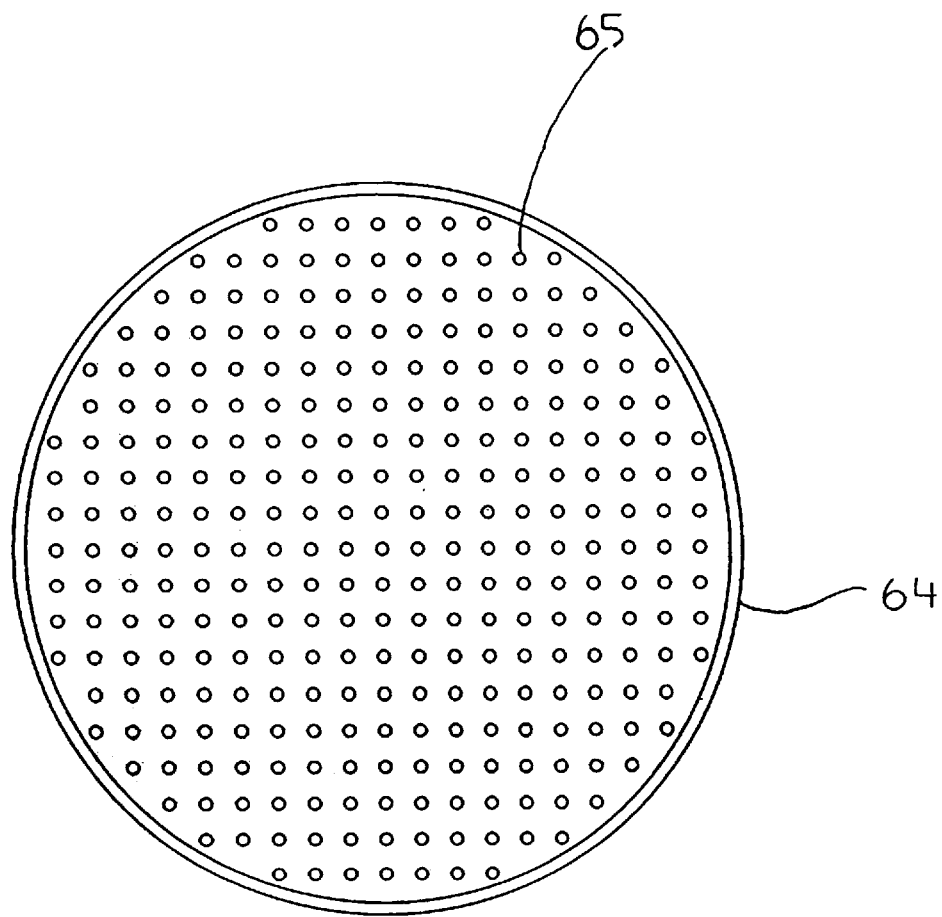
FIG. 5 is a top plan view of a diffusor plate for use in the apparatus of FIG. 3.
Figure 6:
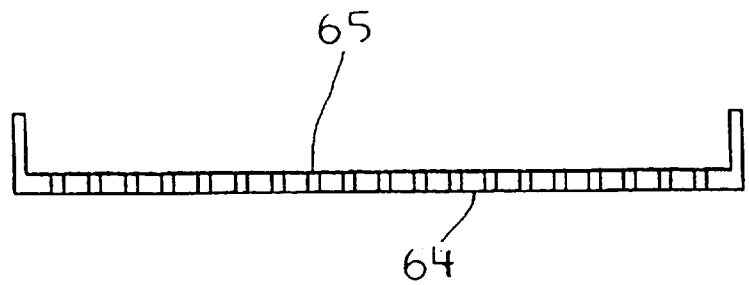
FIG. 6 is a side view of the diffusor plate of FIG. 5.

When water is added to the container 42 during operation, it may disturb the schmutzdeuke unless added carefully. To prevent disturbance of the schmutzdeuke it is preferable to include a diffuser plate 64, shown in FIGS. 4, 5 and 6. The diffuser plate 64, is perforated as the plate 34, with holes 65 and secured as shown in FIG. 4 with bolt 66, nut 67 and washers 68 to the container 42 above the top 51 of the sand 50. The diffuser plate 64 is located about 3 cm above the top 51 of the sand 50, and 5 mm above the minimum water level ML (also referred to as the maintenance water level) and must be capable of distributing water at a rate greater than the raw water supplied to the filter container. Water entering the container 42 during operation gradually percolates onto the schmutzdeuke without disturbing it.

In the upper portion 44 of the container 42, pipe 70 extends through the wall of the container 42 and is fitted with a drain 71 and air vent 72. Pipe 70 is at the same level as pipe 49. Pipe 70 with drawing 71 acts as an emergency drain and must have the same capacity as the pipe 49. The air vent 72 must be of sufficient capacity to allow air in the filter to escape while the container 42 is being filled with raw water, and to enter the filter when water is being drained from the filter. Air in the upper portion 44 of the filter should be at atmospheric pressure.

Figure 7:
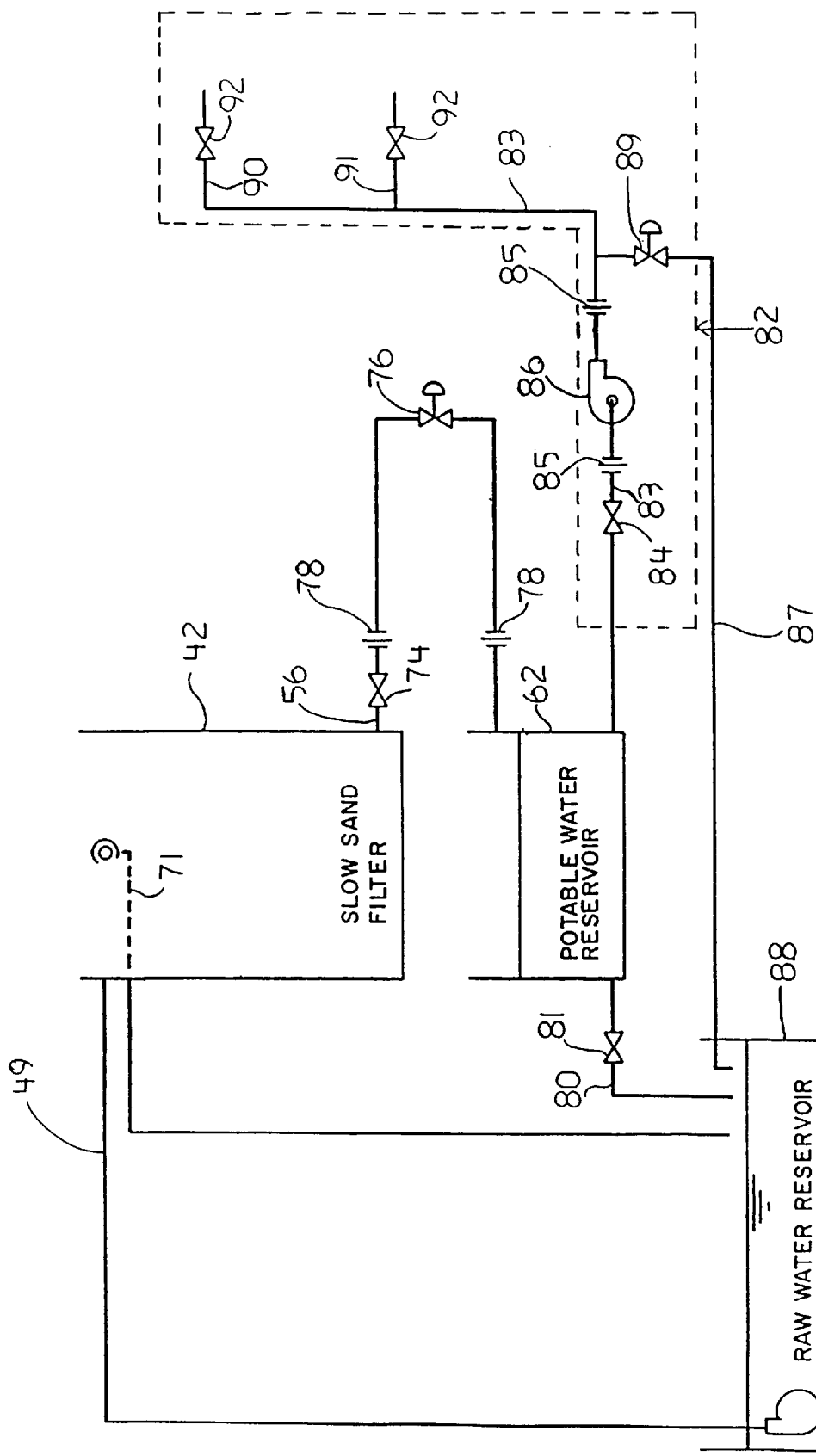
FIG. 7 is a fluid flow schematic of the apparatus shown in FIG. 3.
Figure 8:
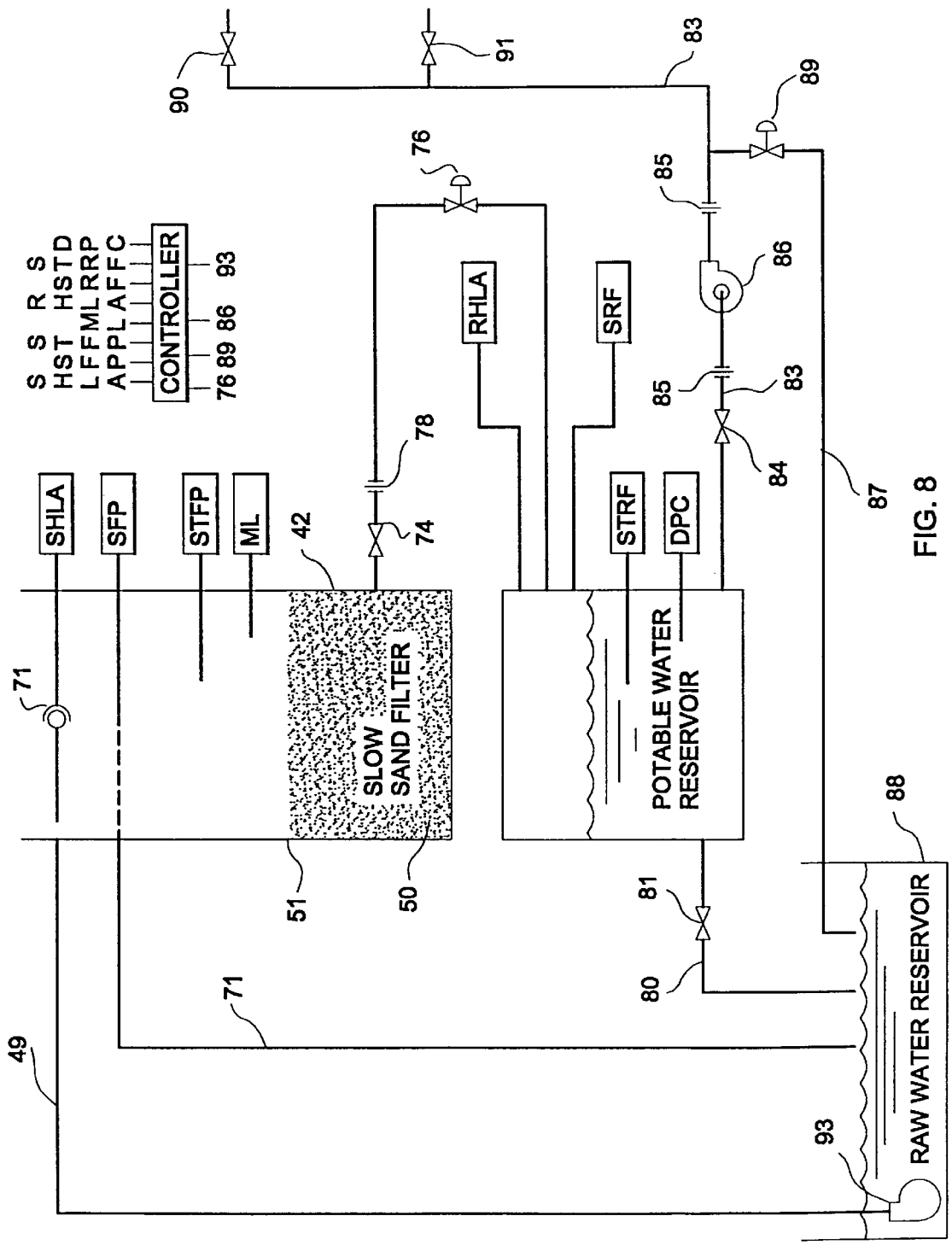
FIG. 8 is a control system schematic for use with the apparatus shown in FIG. 3

Referring now to FIGS. 7 and 8, water flow from the container 42 to potable water reservoir 62 along pipe 56 is controlled by means such as ball valve 74 and solenoid valve 76. Pipe 56 is formed by three lengths of 12 mm PVC tubing joined at unions 78, and solenoid valve 76 is located on the central section of the tubing. The final section of tubing leads into potable water reservoir 62. The potable water reservoir 62 is sized to contain a water supply sufficient for normal use. Flow from the potable water reservoir 62 may be via drain line 80 and ball valve 81, or by distribution system 82 on line 83. Distribution system 82 is isolated from the potable water reservoir by a ball valve 84 on line 83, and provides potable water for use or to the raw water reservoir 88. Distribution of the water is driven by pump 86 secured on line 83 between unions 85. Water from the pump 86 may be returned along line 87 leading to raw water reservoir 88 under control of solenoid valve 89 on line 87 when required to freshen the filter, or along a continuation of line 83 to lines 90 and 91 where potable water may be made available from valves (faucets) 92. Water is supplied from the raw water reservoir 88 to the container 42 using pump 93 on intake line 49. If the raw water reservoir 88 is elevated above the container 42, the feed pump 88 may be replaced by a solenoid valve. The feed pump 88 or solenoid valve constitute a water inlet control means for controllably supplying water to the water inlet line. The drain 71 may be returned directly to the raw water reservoir 88 or to waste.

Control of water levels in the container 42 and in the potable water reservoir 62 is accomplished using the water flow controls just described and water level detectors in the container 42 and potable water reservoir 62. The water level detectors in the container 42 detect the following levels: maintenance level ML, 25 mm above the top 51 of the sand 50; high level alarm SHLA, 18 cm above the top 51; stop feed pump SFP, 15 cm above the top 51; and start feed pump STFP, 50 mm above the top 51 of the sand 50. The levels are shown in FIG. 8. To maintain the schmutzdeuke, the water level must be maintained during periods of non-use at or near the maintenance level ML. The maintenance level ML is selected according the criteria described above for the manually operated slow sand filter.

Water levels in the potable water reservoir 62 are detected by detectors that detect the following levels: high level alarm RHLA, 25 mm from the top 96 of the reservoir 62; stop reservoir flow SRF, 75 mm from the top 96 of the reservoir 62; start reservoir flow STRF, 200 mm from the top 96 of the reservoir 62; and distribution pump cutoff DPC, 50 mm from the bottom 98 of the reservoir 62, above the outlet lines 80 and 83. The initials refer to the levels shown in FIG. 8. The detectors are shown schematically at the levels.

When water is used, water must be pumped from the potable water reservoir 62 and this water replaced. The following description describes the fill cycle for the potable water reservoir 62. When water is used from the lines 90 and 91, the distribution pump 86 is automatically turned on and off as required forcing water from the reservoir 62 along line 83 to one of lines 90 and 91 (there may be other lines similar to 90 and 91). The water level in the potable water reservoir 62 will then drop. When the water in the potable water reservoir drops to STRF, solenoid valve 89 is turned on and the feed pump 93 is started. The feed pump 93 will supply water to the container 42 faster than it can be drained out through line 56, causing the water level in the container 42 to rise. When the water level reaches SFP, the feed pump 93 is turned off, stopping the flow of water into the container 42. Water in the container 42 will continue to flow into the pipe 56 and into the reservoir 62 until the SFP level is reached in the container 42. Then the feed pump 93 is turned on again. This cycle is then repeated as required to fill the potable water reservoir 62.

When the water in the potable water reservoir 62 reaches SRF due to supply of water from container 62 on line 56, the feed pump 93 is stopped but solenoid valve 76 stays open.

It is desirable to drain the container to the maintenance level ML during times when the potable water supply is not being used, since this is the optimum level for the prolongation of the life of the schmutzdeuke, and the following procedure, which forms part of the potable water reservoir fill cycle, accomplishes this. The water level in the potable water reservoir 62 is allowed to reach RHLA through draining of filtered water from the container 42 and when this level is reached, solenoid valve 89 is opened to drain the potable water reservoir. When the water level in the potable water reservoir 62 reaches SRF, solenoid valve 89 is closed. Water then continues to drain through line 56 from the container 42 and these steps are repeated as required until the water level in the container 42 reaches ML, at which point the solenoid valve 76 is closed. This concludes the potable water reservoir fill cycle.

When water is not used from the potable water reservoir 62 for 24 hours, it is desirable to refresh the reservoir water (refresh cycle). Valve 89 is opened allowing potable water to drain into the raw water reservoir 87 until the level of water in the potable water reservoir 62 reaches STRF, at which point valve 89 is closed.

If water in the container 42 reaches SHLA (water level too high in the container 42), it must be reduced using the following potable water reservoir high level reduction cycle. The feed pump 93 is turned off until the water level in the container 42 reduces to level ML and valve 89 is opened until the water level in the potable water reservoir reduces to STRF. The level of the water in the container 42 will then be at ML and the potable water reservoir fill cycle may then be started.

If the water level in the potable water reservoir 62 reaches DPC, the water level in the potable water reservoir 62 must be increased, by simply turning off the distribution pump 86 until the water level in the potable water reservoir 62 reaches STRF.

The algorithms so described are implemented in a controller 100 connected to receive signals from each of the detectors and to control the pumps 86 and 93 and each of the valves. The controller may be a programmable logic controller (PLC) such as model number 1747-L20C/F 12-DC SNK 8-RLY available from Allen Bradley Co., programmed according to the software following at the end of the detailed description of the invention and before the claims, or may be a CPU (for example, Microchip PIC16C55/57 VLSI controllers) programmed in like manner. The software carries out the process control steps described in this patent document and could be readily programmed by any skilled programmer from the description in this patent document. The controller provides signals to the pumps and valves to control their operation and maintain the water levels at desired levels.

A person skilled in the art could make immaterial modifications to the invention described and claimed in this patent without departing from the essence of the invention.

---

Slow Sand Filter PLC Control Program (Ver 0.3) September 07, 1993
Page 1
Program Listing          Processor File: SSF2.ACH          Rung 2:0
Rung 2:0
Low Level Alarm, Turns OFF when low level reached.
```
     I:0.0                                                 B3
--] [---------------------------------------------------( )--
       0                                                    1
B3/1
                  -] [- 2:14
                  -]/[- 2:13
                  -( )- 2:0
I:0.0/0
                  -] [- 2:0
```

-continued

```
Rung 2:1
Feed Pump Start, Turns OFF when level is reached.
     I:0.0                                                 B3
--] [---------------------------------------------------( )--
       1                                                    2
B3/2
                  -]/[- 2:13
                  -( )- 2:1
I:0.0/1
                  -] [- 2:1
Rung 2:2
Feed Pump Stop, Turns ON when level reached.
     I:0.0                                                 B3
--] [---------------------------------------------------( )--
       2                                                    3
B3/3
                  -]/[- 2:13
                  -( )- 2:2
I:0.0/2
                  -] [- 2:2
Rung 2:3
High Level Alarm, Turns ON when level reached
     I:0.0                                                 B3
--] [---------------------------------------------------( )--
       3                                                    4
B3/4
                  -] [- 2:16
                  -( )- 2:3
I:0.0/3
                  -] [- 2:3
Program Listing          Processor File: SSF2.ACH          Rung 2:4
Rung 2:4
Reservoir High and Draining, Turns ON when reservoir level is high
     I:0.0                                                 B3
--] [---------------------------------------------------( )--
       4                                                    5
B3/5
                  -] [- 2:15
                  -]/[- 2:12
                  -( )- 2:4
I:0.0/4
                  -] [- 2:4
Rung 2:5
Reservoir Low and Filling, Turns OFF when reservoir low level
reached.
     I:0.0                                                 B3
--] [---------------------------------------------------( )--
       5                                                    6
B3/6
                  -] [- 2:21
                  -]/[- 2:12 2:17
                  -( )- 2:5
I:0.0/5
                  -] [- 2:5
Rung 2:6
Distribution Pump Low Level Reached, Turns OFF when distribution
pump low level is reached.
     I:0.0                                                 B3
--] [---------------------------------------------------( )--
       6                                                    7
B3/7
                  -]/[- 2:17
                  -( )- 2:6
I:0.0/6
                  -] [- 2:6
Rung 2:7
Reservoir High Level Alarm, Turns ON when the High level alarm is
reached.
     I:0.0                                                 B3
--] [---------------------------------------------------( )--
       7                                                   20
B3/20
                  -] [- 2:15
                  -( )- 2:7
I:0.0/7
                  -] [-2:7
```

```
Program Listing        Processor File: SSF2.ACH        Rung 2:8
Rung 2:8
Solenoid #2, ON Freshens the Slow Sand Filter
     B3                                                   0:0.0
--][------------------------------------------------( )--
      8                                                    0
B3/8
              -][- 2:8
              -( )- 2:16
0:0.0/0
              -( )- 2:8
Rung 2:9
Solenoid #1, ON fills the reservoir
     B3                                                   0:0.0
--][------------------------------------------------( )--
      9                                                    1
B3/9
              -][- 2:9 2:14
              -( )- 2:14
0:0.0/1
              -( )- 2:9
Rung 2:10
Feed Pump, ON starts the feed pump
     B3                                                   0:0.0
--][------------------------------------------------( )--
     10                                                    4
B3/10
              -][- 2:10 2:13
              -( )- 2:13
0:0.0/4
              -( )- 2:10
Rung 2:11
Distribution Pump Power, This is ON except when the reservoir
distribution pump low level is reached.
     B3                                                   0:0.0
--][------------------------------------------------( )--
     11                                                    5
B3/11
              -][- 2:11
              -( )- 2:18
0:0.0/5
              -( )- 2:11
Program Listing        Processor File: SSF2.ACH        Rung 2:12
Rung 2:12
Reservoir Low Level Latch, When low level reached, self latches,
when high level reached latch is broken
     B3       B3                                          B3
-+--]/[--+--]/[---------------------------------------( )--
     6        5                                           12
     B3
 +--][--+
     12
B3/5
              -][- 2:15
              -]/[- 2:12
              -( )- 2:4
B3/6
              -][- 2:21
              -]/[- 2:12 2:17
              -( )- 2:5
B3/12
              -][- 2:12 2:13 2:14 2:22
              -( )- 2:12
Rung 2:13
Slow Sand Filter start feed pump latch
     B3       B3    B3                                    B3
-+--]/[--+--]/[---][----------------------------------( )--
     2        3    12                                     10
     B3
 +--]/[--+
     1
 +--][--+
     10
B3/1
              -][- 2:14
              -]/[- 2:13
              -( )- 2:0
B3/2
              -]/[- 2:13
              -( )- 2:1

B3/3
              -]/[- 2:13
              -( )- 2:2
B3/10
              -][- 2:10 2:13
              -( )- 2:13
B3/12
              -][- 2:12 2:13 2:14 2:22
              -( ) -2:12
Program Listing        Processor File: SSf2.ACH        Rung 2:14
Rung 2:14
Solenoid #1 Latch, Reservoir fill solenoid turns ON when the
Reservoir Down and Filling turns OFF. Solenoid valve stays on until
the slow sand filter maintenance level is reached.
     B3       B3                                          B3
-+--][--+--][----------------------------------------( )--
     12       1                                            9
     B3
 +--][--+
     9
B3/1
              -][- 2:14
              -]/[- 2:13
              -( )- 2:0
B3/9
              -][- 2:9 2:14
              -( )- 2:14
B3/12
              -][- 2:12 2:13 2:14 2:22
              -( )- 2:12
Rung 2:15
Reservoir high level latch. B3/22 is latched ON when the reservoir
high level alarm is ON. The circuit is unlatched when the
reservoir Up and Draining level is reached.
     B3       B3                                          B3
-+--][--+--][----------------------------------------( )--
     20       5                                           22
     B3
 +--][--+
     22
B3/5
              -][- 2:15
              -]/[- 2:12
              -( )- 2:4
B3/20
              -][- 2:15
              -( )- 2:7
B3/12
              -][- 2:15 2:16
              -( )- 2:15
Program Listing        Processor File: SSF2.ACH        Rung 2:16
Rung 2:16
Freshen Cycle. Solenoid #2 to be turned ON when the high level
alarm in the slow sand filter is activated OR when it is time to
freshen the slow sand filter (B3/13) OR when the reservoir must be
drained from the high level alarm to the up and draining level
(B3/22)
     B3                                                   B3
-+--][--+--------------------------------------------( )--
     4                                                     8
     B3
 +--][--+
     13
     B3
 +--][--+
     22
B3/4
              -][- 2:16
              -( )- 2:3
B3/8
              -][- 2:8
              -( )- 2:16
B3/13
              -][- 2:16 2:21
              -( )- 2:21
B3/22
              -][- 2:15 2:16
              -( )- 2:15
```

-continued

Rung 2:17
Distribution pump low level cutoff latch. Latches when the
distribution pump low level is reached and stays latched until the
reservoir down and filling level is reached.
```
      B3         B3                                         B3
-+--]/[--+--]/[----------------------------------------( )--
   7        6                                               21
     B3
  +--] [--+
      21
B3/6
              -] [- 2:21
              -]/[- 2:12 2:17
              -( )- 2:5
B3/7
              -]/[- 2:17
              -( )- 2:6
B3/21
              -] [- 2:17
              -]/[- 2:18
              -( )- 2:17
```
Program Listing        Processor File: SSF2.ACH        Rung 2:18
Rung 2:18
Disables the distribution pump
```
      B3                                                    B3
--]/[---------------------------------------------------( )--
    21                                                      11
B3/11
              -] [- 2:11
              -( )- 2:18
B3/21
              -] [- 2:17
              -]/[- 2:18
              -( )- 2:17
```
Rung 2:19
Timers for 24 hour freshen delay cycle.
```
     T4:1                                 +TON-----------+
--]/[-----------------------              +TIMER ON DELAY+-(EN)-
       DN                                 Timer    T4:1+-(DN)-
                                          Time Base    0.01
                                          Preset       400
                                          Accum        0
                                          +--------------+
T4:1
              -TON- 2:19
T4:1/DN
              -] [- 2:20
              -]/[- 2:19
Rung 2:2-
    T4:1                                  +CTU-----------+
--]/[-----------------------              +COUNT UP    +-(CU)-
       DN                                 Counter  C5:0+-(DN)-
                                          Preset    21600
                                          Accum        0
                                          +--------------+
C5:0
              -CTU- 2:20
              -RES- 2:22
T4:1/DN
              -] [- 2:20
              -]/[- 2:19
```
Program Listing        Processor File: SSF2.ACH        Rung 2:21
Rung 2:21
Start the freshen cycle if counting is done. Stop the freshen
cycle if the reservoir low and filling level is reached/
```
      C5:0     B3                                           B3
-+--] [--+--] [-----------------------------------------( )--
     DN      6                                              13
     B3
  +--] [--+
      13
B3/6
              -] [- 2:21
              -]/[- 2:12 2:17
              -( )- 2:5
```
B3/13
```
              -] [- 2:16 2:21
              -( )- 2:21
C5:0/DN
              -] [- 2:21 2:22
```
Rung 2:22
Reset the counters is timed out, OR if the reservoir low and
filling level is reached. (We want to recirculate after 24 hours of
non use)
```
      B3                                                   C5:0
-+--] [--+----------------------------------------------(RES)--
      12
     C5:0
  +--] [--+
     DN
B3/12
              -] [- 2:12 2:13 2:14 2:22
              -( )- 2:12
C5:0
              -CTU- 2:20
              -RES- 2:22
C5:0/DN
              -] [- 2:21 2:22
```
Rung 2:23
------------------------+END+------------------------
Program Listing        Processor File: SSF2.ACH        Summary
REPORT OPTIONS SUMMARY
         Insure Valis X-Ref Info:        YES
         Graphics Mode:                  NO
         Page Width:                     80
         Page Length:                    66
         Starting File:                  2
         Ending Fil:                     2
         Power Rail:                     YES
         Address Comments:               YES
         Address Display:                YES
         Rung Comments:                  YES
         Ladder Cross Reference:         ALL The embodiments of the invention in which an exclusive property or privilege is claimed are defined as follows:

1. A method of operating a slow sand filter for use with an intermittent supply of water, the filter including a container, filter material partially filling the container and having a top, a water inlet above the filter material and a water outlet within the filter material, the method comprising the steps of:

supplying an intermittent flow of water to the container; and maintaining the water level in the container above the top of the filter material even when there is no flow of water through the slow sand filter at a maintenance level that is selected such that (1) water falling onto the water in the container does not disturb a schmutzdeuke layer formed on the top of the filter material and (2) the schmutzdeuke will survive even when there is no flow of water through the container for at least 24 hours.

2. The method of claim 1 in which the water level is maintained at between 1 cm and 8 cm above the top of the filter material.

3. The method of claim 1 in which the filter material is quartz sand at ambient temperature.

4. The method of claim 1 further including percolating water through a diffuser plate secured to the container above the maintenance level.

\* \* \* \* \*